(12) United States Patent
Petrosino (10) Patent No.: US 12,202,649 B2
(45) Date of Patent: Jan. 21, 2025

(54) POLYFLUOROALKYL SUBSTANCE FREE CAPS

(71) Applicant: Integrated Liner Technologies, Inc., Rensselaer, NY (US)

(72) Inventor: Paul Petrosino, Slingerlands, NY (US)

(73) Assignee: Integrated Liner Technologies, Inc., Rensselaer, NY (US)

( * ) Notice: Subject to any disclaimer, the term of this patent is extended or adjusted under 35 U.S.C. 154(b) by 0 days.

(21) Appl. No.: 18/431,321

(22) Filed: Feb. 2, 2024

(65) Prior Publication Data

US 2024/0190620 A1 Jun. 13, 2024

Related U.S. Application Data

(63) Continuation of application No. PCT/US2022/045323, filed on Sep. 30, 2022.
(Continued)

(51) Int. Cl.
*C08K 3/08* (2006.01)
*B65D 41/04* (2006.01)
(Continued)

(52) U.S. Cl.
CPC ............ *B65D 41/0478* (2013.01); *C08K 3/08* (2013.01); *C08L 23/12* (2013.01); *C08L 83/04* (2013.01);
(Continued)

(58) Field of Classification Search
None
See application file for complete search history.

(56) References Cited

U.S. PATENT DOCUMENTS

| 4,499,148 A | * | 2/1985 | Goodale | ................. B29C 65/08 156/275.5 |
| 4,635,807 A | * | 1/1987 | Knapp | ................. B65D 51/002 215/247 |

(Continued)

OTHER PUBLICATIONS

Shoemaker, J.A. and Tettenhorst, D.R., Method 537.1: Determination of Selected Per- and Polyfluorinated Alkyl Substances in Drinking Water by Solid Phase Extraction and Liquid Chromatography/ Tandem Mass Spectrometry (LC/MS/MS), EPA document #: EPA/ 600/R-18/352, Version 1.0. Nov. 2018.
(Continued)

*Primary Examiner* — Peter A Salamon
(74) *Attorney, Agent, or Firm* — Meunier Carlin & Curfman LLC

(57) ABSTRACT

The present disclosure provides for a liner comprising a septum and a layer, the layer comprising a thermoplastic polymer, wherein the septum comprises an elastomer and the septum is coupled to the layer comprising the thermoplastic polymer. The present disclosure also provides for a cap assembly comprising the liner as disclosed herein and a cap, wherein the cap is coupled to the liner. Further, provided herein is a cap and vial assembly comprising the cap assembly as disclosed herein and a vial, wherein the cap assembly is coupled to the vial. Also provided herein is a method of testing water quality in a sample using an analytical instrument, wherein the sample is contained within a container comprising the liner as disclosed herein, the cap assembly as disclosed herein, or the cap and vial assembly as disclosed herein, the method comprising penetrating the liner with a syringe to remove a portion of the sample and testing the portion of the sample using the analytical instrument.

16 Claims, 5 Drawing Sheets

A

B

Related U.S. Application Data (60) Provisional application No. 63/389,440, filed on Jul. 15, 2022.

(51) Int. Cl.
*C08L 23/12* (2006.01)
*C08L 83/04* (2006.01)

(52) U.S. Cl.
CPC .. *C08K 2003/0812* (2013.01); *C08L 2203/10* (2013.01)

(56) References Cited

U.S. PATENT DOCUMENTS

| | | | | |
|---|---|---|---|---|
| 5,219,083 | A | * | 6/1993 | Liebert ............... B65D 51/002 220/DIG. 19 |
| 5,647,939 | A | * | 7/1997 | Gee ................... B29C 66/73755 156/308.6 |
| 5,707,589 | A | * | 1/1998 | Fullemann ......... G01N 35/1079 422/537 |
| 6,234,335 | B1 | * | 5/2001 | Gee ..................... B29C 66/5346 604/905 |
| 2012/0024085 | A1 | * | 2/2012 | Faulkner ............. B01L 3/50825 422/63 |
| 2013/0171030 | A1 | * | 7/2013 | Ferlic ................... A61M 39/20 422/294 |
| 2018/0353378 | A1 | | 12/2018 | Py |
| 2021/0261309 | A1 | * | 8/2021 | Schennink .......... B65D 85/505 |

OTHER PUBLICATIONS

International Search Report and Written opinion of the U.S. International Search Authority from application No. PCT/US2022/45323 mailed Jan. 17, 2023, 11 pages.

* cited by examiner

POLYFLUOROALKYL SUBSTANCE FREE CAPS

PRIORITY INFORMATION

The present application is a continuation of PCT International Application No. PCT/US2022/045323, filed on Sep. 30, 2022, which claims priority to U.S. Provisional Patent Application Ser. No. 63/389,440 titled "Polyfluoroalkyl Substance Free Caps" filed on Jul. 15, 2022, the disclosures of which are incorporated by reference herein.

BACKGROUND

Perfluoroalkyl and polyfluoroalkyl substances (PFAS) are man-made chemicals that were developed in the 1940s. PFAS have been used for years in various industries ranging from aerospace and military to consumer products, like clothing, food packaging, and non-stick cookware. Due to their widespread use, many individuals around the world have been exposed to PFAS in their lifetime.

PFAS spreads quickly through the environment and end up in soil, water, and air, and subsequently in agricultural products, livestock, and animal byproducts for human consumption. These chemicals, including perfluorooctanoic acid (PFOA) and perfluorooctane sulfonate (PFOS), are considered 'forever chemicals,' as they do not degrade in the environment and may persist in the human body indefinitely. There are thousands of PFAS with varying levels of toxicity and adverse effects that have been minimally studied.

Certain PFAS can be dangerous at even very low levels and can adversely affect humans in the following ways:
Decreased fertility;
High blood pressure in pregnant women;
Increased risk of obesity and high cholesterol;
Increased risk of cancer;
Liver disease;
Developmental delays in children;
Reduced immunity;
Thyroid issues; and
Changes in hormones.

Testing for PFAS now and in the future will be imperative to addressing the challenges that PFAS pose to humans.

Chromatography and mass spectrometry, which is a method to separate and identify components of a mixture, can be used to test for PFAS. PFAS testing is a rapidly growing area of chromatography testing with newly approved U.S. Environmental Protection Agency (EPA) testing methods, as well as more testing methods in development.

A commonly used closure for chromatography vials is an open top cap, penetrable by a syringe, with a liner that comprises polytetrafluoroethylene (PTFE). PTFE is used in chromatography for its inertness and chemical compatibility with a wide variety of common laboratory chemicals and solvents. However, these standard chromatography caps made with PTFE, a common PFAS, are not suitable for any PFAS testing.

Polypropylene caps have been used when performing water quality testing for PFAS to prevent contamination of samples from PTFE, but the polypropylene caps do not reseal. Thus, multiple penetrations and/or injections from the same vial are not possible (Shoemaker, J. A. and Tettenhorst, D. R., *Method 537.1: Determination of Selected Per- and Polyfluorinated Alkyl Substances in Drinking Water by Solid Phase Extraction and Liquid Chromatography/Tandem Mass Spectrometry (LC/MS/MS)*, EPA Document #: EPA/600/R-18/352, Version 1.0. November 2018). Further, because the polypropylene caps do not reseal upon penetration and removal of a portion of a sample from a vial, the vial containing the sample cannot be stored for future testing, as the sample would evaporate, degrade, and/or become contaminated. Thus, multiple vials containing samples would be needed, potentially requiring an individual to return to the field to gather further samples, if additional testing is to be performed.

The products and methods disclosed herein address these and other needs.

SUMMARY

In accordance with the purposes of the disclosed products and methods, as embodied and broadly described herein, the disclosed subject matter, in one aspect, relates to a liner, cap assembly, and cap and vial assembly, and methods of using thereof.

For example, a liner is provided herein, the liner comprising a septum and a layer comprising a thermoplastic polymer, wherein the septum comprises an elastomer and the septum is coupled to the layer comprising thermoplastic polymer.

In a further example, a cap assembly is provided, the cap assembly comprising the liner as disclosed herein and a cap, wherein the cap is coupled to the liner.

Additionally, a cap and vial assembly is provided, the cap and vial assembly comprising the cap assembly as disclosed herein and a vial, wherein the cap assembly is coupled to the vial.

Further, also disclosed herein is a method of testing water quality in a sample using an analytical instrument, wherein the sample is contained within a container comprising the liner as disclosed herein, the cap assembly as disclosed herein, or the cap and vial assembly as disclosed herein, the method comprising penetrating the liner with a syringe to remove a portion of the sample and testing the portion of the sample using the analytical instrument.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

The accompanying figures, which are incorporated in and constitute a part of this specification, illustrate several aspects of the disclosure, and together with the description, serve to explain the principles of the disclosure.

FIGS. 2A-2B show example cap and vial assemblies with a liner being punctured with a syringe.

DETAILED DESCRIPTION

The following description of the disclosure is provided as an enabling teaching of the disclosure in its best, currently known embodiments. Many modifications and other embodiments disclosed herein will come to mind to one skilled in the art to which the disclosed products and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As can be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or products in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed products and methods belong. It can be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

In this specification and in the claims that follow, reference will be made to a number of terms, which shall be defined to have the following meanings.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of."

As used in the specification and the appended claims, the singular forms "a," "an" and "the" include plural referents unless the context clearly dictates otherwise. Thus, for example, reference to "a compound", "a composition", or "a disorder", includes, but is not limited to, two or more such compounds, compositions, or disorders, and the like.

It should be noted that ratios, concentrations, amounts, and other numerical data can be expressed herein in a range format. It can be further understood that the endpoints of each of the ranges are significant both in relation to the other endpoint, and independently of the other endpoint.

When a range is expressed, a further aspect includes from the one particular value and/or to the other particular value. For example, where the stated range includes one or both of the limits, ranges excluding either or both of those included limits are also included in the disclosure, e.g., the phrase "x to y" includes the range from 'x' to 'y' as well as the range greater than 'x' and less than 'y'. The range can also be expressed as an upper limit, e.g., 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it can be understood that the particular value forms a further aspect. For example, if the value "about 10" is disclosed, then "10" is also disclosed.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "substantially free," when used in the context of a product or component of a product that is substantially absent, is intended to refer to an amount that is then less than about 70 parts per trillion, e.g., less than about 50 parts per trillion, less than about 40 parts per trillion, less than about 25 parts per trillion, or less than about 10 parts per trillion.

As used herein, "cross-sectional shape" refers to the shape in a plane substantially perpendicular to the thickness, wherein "thickness" refers to the average dimension between opposite surfaces of an object.

The term "characteristic dimension," as used herein, refers to the largest straight-line distance between two points in the plane of a cross-sectional shape. Herein, the plane of a cross-sectional shape can be that of a liner or cap, for example. "Average characteristic dimension" generally refers to the statistical mean characteristic dimension. For example, when the liner or cap has a cross-sectional shape that is substantially circular, the average characteristic dimension can refer to the average diameter.

The term "(co)polymer" includes homopolymers, copolymers, or mixtures thereof.

As used herein, "molecular weight" refers to number-average molecular weight as measured by $^1$H NMR spectroscopy, unless clearly indicated otherwise.

Chemical Definitions

Unless otherwise defined, all technical and scientific terms used herein have the same meaning as commonly understood by one of ordinary skill in the art to which this invention belongs.

The organic moieties mentioned when defining variable positions within the general formulae described herein (e.g., the term "halogen") are collective terms for the individual substituents encompassed by the organic moiety. The prefix $C_n$-$C_m$ preceding a group or moiety indicates, in each case, the possible number of carbon atoms in the group or moiety that follows.

The term "ion," as used herein, refers to any molecule, portion of a molecule, cluster of molecules, molecular complex, moiety, or atom that contains a charge (positive, negative, or both at the same time within one molecule, cluster of molecules, molecular complex, or moiety (e.g., zwitterions)) or that can be made to contain a charge. Methods for producing a charge in a molecule, portion of a molecule, cluster of molecules, molecular complex, moiety, or atom are disclosed herein and can be accomplished by methods known in the art, e.g., protonation, deprotonation, oxidation, reduction, alkylation, acetylation, esterification, de-esterification, hydrolysis, etc.

The term "anion" is a type of ion and is included within the meaning of the term "ion." An "anion" is any molecule, portion of a molecule (e.g., zwitterion), cluster of molecules, molecular complex, moiety, or atom that contains a net negative charge or that can be made to contain a net negative charge. The term "anion precursor" is used herein to specifically refer to a molecule that can be converted to an anion via a chemical reaction (e.g., deprotonation).

The term "cation" is a type of ion and is included within the meaning of the term "ion." A "cation" is any molecule, portion of a molecule (e.g., zwitterion), cluster of molecules, molecular complex, moiety, or atom, that contains a net positive charge or that can be made to contain a net positive charge. The term "cation precursor" is used herein to specifically refer to a molecule that can be converted to a cation via a chemical reaction (e.g., protonation or alkylation).

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

"$Z^1$," "$Z^2$," "$Z^3$," and "$Z^4$" are used herein as generic symbols to represent various specific substituents. These symbols can be any substituent, not limited to those disclosed herein, and when they are defined to be certain substituents in one instance, they can, in another instance, be defined as some other substituents.

The term "aliphatic" as used herein refers to a non-aromatic hydrocarbon group and includes branched and unbranched, alkyl, alkenyl, or alkynyl groups.

As used herein, the term "alkyl" refers to saturated, straight-chained or branched saturated hydrocarbon moieties. Unless otherwise specified, $C_1$-$C_{24}$ (e.g., $C_1$-$C_{22}$, $C_1$-$C_{20}$, $C_1$-$C_{18}$, $C_1$-$C_{16}$, $C_1$-$C_{14}$, $C_1$-$C_{12}$, $C_1$-$C_{10}$, $C_1$-$C_8$, $C_1$-$C_6$, or $C_1$-$C_4$) alkyl groups are intended. Examples of alkyl groups include methyl, ethyl, propyl, 1-methyl-ethyl, butyl, 1-methyl-propyl, 2-methyl-propyl, 1,1-dimethyl-ethyl, pentyl, 1-methyl-butyl, 2-methyl-butyl, 3-methyl-butyl, 2,2-dimethyl-propyl, 1-ethyl-propyl, hexyl, 1,1-dimethyl-propyl, 1,2-dimethyl-propyl, 1-methyl-pentyl, 2-methyl-pentyl, 3-methyl-pentyl, 4-methyl-pentyl, 1,1-dimethyl-butyl, 1,2-dimethyl-butyl, 1,3-dimethyl-butyl, 2,2-dimethyl-butyl, 2,3-dimethyl-butyl, 3,3-dimethyl-butyl, 1-ethyl-butyl, 2-ethyl-butyl, 1,1,2-trimethyl-propyl, 1,2,2-trimethyl-propyl, 1-ethyl-1-methyl-propyl, 1-ethyl-2-methyl-propyl, heptyl, octyl, nonyl, decyl, dodecyl, tetradecyl, hexadecyl, cicosyl, tetracosyl, and the like. Alkyl substituents may be unsubstituted or substituted with one or more chemical moieties. The alkyl group can be substituted with one or more groups including, but not limited to, hydroxyl, halogen, acetal, acyl, alkyl, alkoxy, alkenyl, alkynyl, aryl, heteroaryl, aldehyde, amino, cyano, carboxylic acid, ester, ether, carbonate ester, carbamate ester, ketone, nitro, phosphonyl, silyl, sulfo-oxo, sulfonyl, sulfone, sulfoxide, or thiol, as described below, provided that the substituents are sterically compatible and the rules of chemical bonding and strain energy are satisfied.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" or "haloalkyl" specifically refers to an alkyl group that is substituted with one or more halides (halogens; e.g., fluorine, chlorine, bromine, or iodine). The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

As used herein, the term "alkenyl" refers to unsaturated, straight-chained, or branched hydrocarbon moieties containing a double bond. Unless otherwise specified, $C_2$-$C_{24}$ (e.g., $C_2$-$C_{22}$, $C_2$-$C_{20}$, $C_2$-$C_{18}$, $C_2$-$C_{16}$, $C_2$-$C_{14}$, $C_2$-$C_{12}$, $C_2$-$C_{10}$, $C_2$-$C_8$, $C_2$-$C_6$, or $C_2$-$C_4$) alkenyl groups are intended. Alkenyl groups may contain more than one unsaturated bond. Examples include ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl, and 1-ethyl-2-methyl-2-propenyl. The term "vinyl" refers to a group having the structure —CH═CH$_2$; 1-propenyl refers to a group with the structure —CH═CH—CH$_3$; and 2-propenyl refers to a group with the structure —CH$_2$—CH═CH$_2$. Asymmetric structures such as $(Z^1Z^2)C$═$C(Z^3Z^4)$ are intended to include both the E and Z isomers. This can be presumed in structural formulae herein wherein an asymmetric alkene is present, or it can be explicitly indicated by the bond symbol C═C. Alkenyl substituents may be unsubstituted or substituted with one or more chemical moieties. Examples of suitable substituents include, for example, alkyl, alkoxy, alkenyl, alkynyl, aryl, heteroaryl, acetal, acyl, aldehyde, amino, cyano, carboxylic acid, ester, ether, carbonate ester, carbamate ester, halide, hydroxyl, ketone, nitro, phosphonyl, silyl, sulfo-oxo, sulfonyl, sulfone, sulfoxide, or thiol, as described below, provided that the substituents are sterically compatible and the rules of chemical bonding and strain energy are satisfied.

As used herein, the term "alkynyl" represents straight-chained or branched hydrocarbon moieties containing a triple bond. Unless otherwise specified, $C_2$-$C_{24}$ (e.g., $C_2$-$C_{24}$, $C_2$-$C_{20}$, $C_2$-$C_{18}$, $C_2$-$C_{16}$, $C_2$-$C_{14}$, $C_2$-$C_{12}$, $C_2$-$C_{10}$, $C_2$-$C_8$, $C_2$-$C_6$, or $C_2$-$C_4$) alkynyl groups are intended. Alkynyl groups may contain more than one unsaturated bond. Examples include $C_2$-$C_6$-alkynyl, such as ethynyl, 1-propynyl, 2-propynyl (or propargyl), 1-butynyl, 2-butynyl, 3-butynyl, 1-methyl-2-propynyl, 1-pentynyl, 2-pentynyl, 3-pentynyl, 4-pentynyl, 3-methyl-1-butynyl, 1-methyl-2-butynyl, 1-methyl-3-butynyl, 2-methyl-3-butynyl, 1,1-dimethyl-2-propynyl, 1-ethyl-2-propynyl, 1-hexynyl, 2-hexynyl, 3-hexynyl, 4-hexynyl, 5-hexynyl, 3-methyl-1-pentynyl, 4-methyl-1-pentynyl, 1-methyl-2-pentynyl, 4-methyl-2-pentynyl, 1-methyl-3-pentynyl, 2-methyl-3-pentynyl, 1-methyl-4-pentynyl, 2-methyl-4-pentynyl, 3-methyl-4-pentynyl, 1,1-dimethyl-2-butynyl, 1,1-dimethyl-3-butynyl, 1,2-dimethyl-3-butynyl, 2,2-dimethyl-3-butynyl, 3,3-dimethyl-1-butynyl, 1-ethyl-2-butynyl, 1-ethyl-3-butynyl, 2-ethyl-3-butynyl, and 1-ethyl-1-methyl-2-propynyl. Alkynyl substituents may be unsubstituted or substituted with one or more chemical moieties. Examples of suitable substituents include, for example, alkyl, alkoxy, alkenyl, alkynyl, aryl, heteroaryl, acetal, acyl, aldehyde, amino, cyano, carboxylic acid, ester, ether, carbonate ester, carbamate ester, halide, hydroxyl, ketone, nitro, phosphonyl, silyl, sulfo-oxo, sulfonyl, sulfone, sulfoxide, or thiol, as described below.

As used herein, the term "aryl," as well as derivative terms such as aryloxy, refers to groups that include a monovalent aromatic carbocyclic group of from 3 to 50 carbon atoms. Aryl groups can include a single ring or multiple condensed rings. In some embodiments, aryl groups include $C_6$-$C_{10}$ aryl groups. Examples of aryl groups include, but are not limited to, benzene, phenyl, biphenyl, naphthyl, tetrahydronaphthyl, phenylcyclopropyl, phenoxybenzene, and indanyl. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. The term "non-heteroaryl," which is also included in the term "aryl," defines a group that contains an aromatic group that does not contain a heteroatom. The aryl substituents may be unsubstituted or substituted with one or more chemical moieties. Examples of suitable substituents include, for example, alkyl, alkoxy, alkenyl, alkynyl, aryl, heteroaryl, acetal, acyl, aldehyde, amino, cyano, carboxylic acid, ester, ether, carbonate ester, carbamate ester, halide, hydroxyl, ketone, nitro, phosphonyl, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, acetal, acyl, aldehyde, amino, cyano, carboxylic acid, ester, ether, carbonate ester, carbamate ester, halide, hydroxyl, ketone, nitro, phosphonyl, silyl, sulfo-oxo, sulfonyl, sulfone, sulfoxide, or thiol as described herein.

The term "cycloalkenyl" as used herein is a non-aromatic carbon-based ring composed of at least three carbon atoms and containing at least one double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, acetal, acyl, aldehyde, amino, cyano, carboxylic acid, ester, ether, carbonate ester, carbamate ester, halide, hydroxyl, ketone, nitro, phosphonyl, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems (e.g., monocyclic, bicyclic, tricyclic, polycyclic, etc.) that can be substituted or unsubstituted. A cyclic group can contain one or more aryl groups, one or more non-aryl groups, or one or more aryl groups and one or more non-aryl groups.

The term "acyl" as used herein is represented by the formula —C(O)$Z^1$ where $Z^1$ can be a hydrogen, hydroxyl, alkoxy, alkyl, alkenyl, alkynyl, aryl, heteroaryl, cycloalkyl, cycloalkenyl, heterocycloalkyl, or heterocycloalkenyl group described above. As used herein, the term "acyl" can be used interchangeably with "carbonyl." Throughout this specification "C(O)" or "CO" is a shorthand notation for C=O.

The term "acetal" as used herein is represented by the formula ($Z^1Z^2$)C(=O$Z^3$)(=O$Z^4$), where $Z^1$, $Z^2$, $Z^3$, and $Z^4$ can be, independently, a hydrogen, halogen, hydroxyl, alkyl, alkenyl, alkynyl, aryl, heteroaryl, cycloalkyl, cycloalkenyl, heterocycloalkyl, or heterocycloalkenyl group described above.

The term "alkanol" as used herein is represented by the formula $Z^1$OH, where $Z^1$ can be an alkyl, alkenyl, alkynyl, aryl, heteroaryl, cycloalkyl, cycloalkenyl, heterocycloalkyl, or heterocycloalkenyl group described above.

As used herein, the term "alkoxy" as used herein is an alkyl group bound through a single, terminal ether linkage; that is, an "alkoxy" group can be defined as to a group of the formula $Z^1$—O—, where $Z^1$ is unsubstituted or substituted alkyl as defined above. Unless otherwise specified, alkoxy groups wherein $Z^1$ is a $C_1$-$C_{24}$ (e.g., $C_1$-$C_{22}$, $C_1$-$C_{20}$, $C_1$-$C_{18}$, $C_1$-$C_{16}$, $C_1$-$C_{14}$, $C_1$-$C_{12}$, $C_1$-$C_{10}$, $C_1$-$C_8$, $C_1$-$C_6$, or $C_1$-$C_4$) alkyl group are intended. Examples include methoxy, ethoxy, propoxy, 1-methyl-ethoxy, butoxy, 1-methyl-propoxy, 2-methyl-propoxy, 1,1-dimethyl-ethoxy, pentoxy, 1-methyl-butyloxy, 2-methyl-butoxy, 3-methyl-butoxy, 2,2-di-methyl-propoxy, 1-ethyl-propoxy, hexoxy, 1,1-dimethyl-propoxy, 1,2-dimethyl-propoxy, 1-methyl-pentoxy, 2-methyl-pentoxy, 3-methyl-pentoxy, 4-methyl-penoxy, 1,1-dimethyl-butoxy, 1,2-dimethyl-butoxy, 1,3-dimethyl-butoxy, 2,2-dimethyl-butoxy, 2,3-dimethyl-butoxy, 3,3-dimethyl-butoxy, 1-ethyl-butoxy, 2-ethylbutoxy, 1,1,2-trimethyl-propoxy, 1,2,2-trimethyl-propoxy, 1-ethyl-1-methyl-propoxy, and 1-ethyl-2-methyl-propoxy.

The term "aldehyde" as used herein is represented by the formula —C(O)H. Throughout this specification "C(O)" is a shorthand notation for C=O.

The terms "amine" or "amino" as used herein are represented by the formula —N$Z^1Z^2Z^3$, where $Z^1$, $Z^2$, and $Z^3$ can each be substitution group as described herein, such as hydrogen, an alkyl, alkenyl, alkynyl, aryl, heteroaryl, cycloalkyl, cycloalkenyl, heterocycloalkyl, or heterocycloalkenyl group described above.

The terms "amide" or "amido" as used herein are represented by the formula —C(O)N$Z^1Z^2$, where $Z^1$ and $Z^2$ can each be substitution group as described herein, such as hydrogen, an alkyl, alkenyl, alkynyl, aryl, heteroaryl, cycloalkyl, cycloalkenyl, heterocycloalkyl, or heterocycloalkenyl group described above.

The term "anhydride" as used herein is represented by the formula $Z^1C(O)OC(O)Z^2$ where $Z^1$ and $Z^2$, independently, can be an alkyl, alkenyl, alkynyl, aryl, heteroaryl, cycloalkyl, cycloalkenyl, heterocycloalkyl, or heterocycloalkenyl group described above.

The term "cyclic anhydride" as used herein is represented by the formula:

where $Z^1$ can be an alkyl, alkenyl, alkynyl, aryl, heteroaryl, cycloalkyl, cycloalkenyl, heterocycloalkyl, or heterocycloalkenyl group described above.

The term "azide" as used herein is represented by the formula —N=N=N.

The term "carboxylic acid" as used herein is represented by the formula —C(O)OH.

A "carboxylate" or "carboxyl" group as used herein is represented by the formula —C(O)O⁻.

A "carbonate ester" group as used herein is represented by the formula $Z^1OC(O)OZ^2$.

The term "cyano" as used herein is represented by the formula —CN.

The term "ester" as used herein is represented by the formula —OC(O)Z¹ or —C(O)OZ¹, where $Z^1$ can be an alkyl, alkenyl, alkynyl, aryl, heteroaryl, cycloalkyl, cycloalkenyl, heterocycloalkyl, or heterocycloalkenyl group described above.

The term "ether" as used herein is represented by the formula $Z^1OZ^2$, where $Z^1$ and $Z^2$ can be, independently, an alkyl, alkenyl, alkynyl, aryl, heteroaryl, cycloalkyl, cycloalkenyl, heterocycloalkyl, or heterocycloalkenyl group described above.

The term "epoxy" or "epoxide" as used herein refers to a cyclic ether with a three atom ring and can represented by the formula:

where $Z^1$, $Z^2$, $Z^3$, and $Z^4$ can be, independently, an alkyl, alkenyl, alkynyl, aryl, heteroaryl, cycloalkyl, cycloalkenyl, heterocycloalkyl, or heterocycloalkenyl group described above The term "ketone" as used herein is represented by the formula $Z^1C(O)Z^2$, where $Z^1$ and $Z^2$ can be, independently, an alkyl, alkenyl, alkynyl, aryl, heteroaryl, cycloalkyl, cycloalkenyl, heterocycloalkyl, or heterocycloalkenyl group described above.

The term "halide" or "halogen" or "halo" as used herein refers to fluorine, chlorine, bromine, and iodine.

The term "hydroxyl" as used herein is represented by the formula —OH.

The term "nitro" as used herein is represented by the formula —NO₂.

The term "phosphonyl" is used herein to refer to the phospho-oxo group represented by the formula —(O)(OZ¹)₂, where $Z^1$ can be hydrogen, an alkyl, alkenyl, alkynyl, aryl, heteroaryl, cycloalkyl, cycloalkenyl, heterocycloalkyl, or heterocycloalkenyl group described above.

The term "silyl" as used herein is represented by the formula —SiZ¹Z²Z³, where $Z^1$, $Z^2$, and $Z^3$ can be, independently, hydrogen, alkyl, alkoxy, alkenyl, alkynyl, aryl, heteroaryl, cycloalkyl, cycloalkenyl, heterocycloalkyl, or heterocycloalkenyl group described above.

The term "sulfonyl" or "sulfone" is used herein to refer to the sulfo-oxo group represented by the formula —S(O)₂Z¹, where $Z^1$ can be hydrogen, an alkyl, alkenyl, alkynyl, aryl, heteroaryl, cycloalkyl, cycloalkenyl, heterocycloalkyl, or heterocycloalkenyl group described above.

The term "sulfide" as used herein is comprises the formula —S—.

The term "thiol" as used herein is represented by the formula —SH.

"R¹," "R²," "R³," "R$^n$," etc., where n is some integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an amine group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

Unless stated to the contrary, a formula with chemical bonds shown only as solid lines and not as wedges or dashed lines contemplates each possible stereoisomer or mixture of stereoisomer (e.g., each enantiomer, each diastereomer, each meso compound, a racemic mixture, or scalemic mixture).

Products

Liner

Provided herein is a liner (104) comprising a septum (110) and a layer comprising a thermoplastic polymer (108), wherein the septum (110) comprises an elastomer and the septum (110) is coupled to the layer comprising the thermoplastic polymer (108).

As used herein, a liner (104) can securely seal samples in a container such that the sample is separate from an external environment while simultaneously allowing for extraction of the sample, for example via a syringe (118).

Figures 5A, 5B:
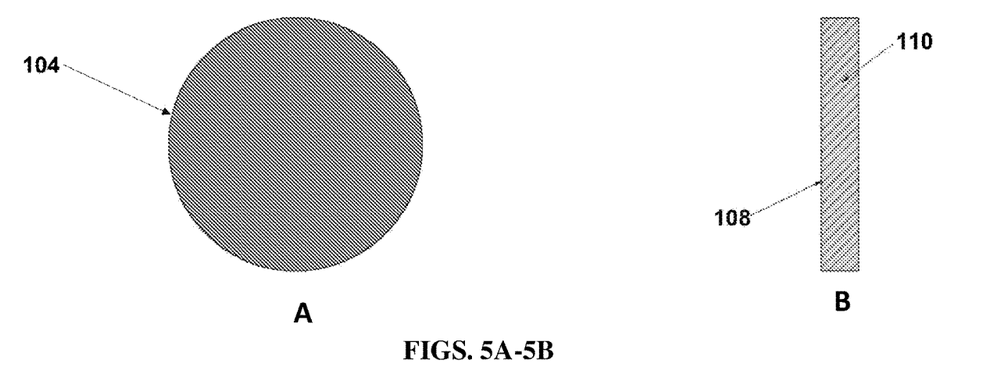
FIGS. 5A-5B show perspective views of an example liner having a single layer of thermoplastic polymer.

Referring now to FIGS. 5A-5B, FIG. 5A is a perspective view of an example liner (104) with a diameter of 24 mm. FIG. 5B is a perspective view of the side of an example liner (104) with a diameter of 24 mm comprising an example septum (110) comprising silicone rubber coupled to an example first layer of a first thermoplastic polymer (108), wherein the first thermoplastic polymer comprises polypropylene.

As used herein, a septum (110) refers to a membrane used in techniques for the transfer of substances. In some examples the septum (110) can be made of a rubber. In further examples, the membrane can be chemically resistant. In specific examples, the septum (110) can be used with a syringe (118) to transfer a substance from, for example, a vial to a gas chromatograph, liquid chromatograph, mass spectrometer, or any combination thereof for separation, purification, and/or identification. A septum (110) can be used when transferring a solid, liquid, gas, or any combination thereof.

The septum (110) can comprise an elastomer. Elastomers are any material exhibiting elastic or rubber-like properties and can be natural or synthetic. Elastomeric materials (e.g., materials comprising elastomers) include, but are not limited to, foams and sponges, rubbers, cork products, and any combination thereof. Rubbers include, for example, urethanes, chloroprenes, neoprenes, isoprene rubbers, acrylonitrile butadiene rubbers, ethylene propylene rubbers, fluoroelastomers, silicone rubbers, styrene butadiene rubbers, fluorosilicones, and polyisobutylene rubbers (also referred to as "butyl").

In some examples, the elastomer comprises silicone rubber. Silicone rubber is a durable and resistant elastomer comprising silicone, which comprises silicon, carbon, hydrogen, and oxygen. The silicone rubber comprises a siloxane backbone and an organic moiety bound to the silicon, as per the following general formula (where "R" is the organic moiety):

Formula I

Silicone can have a tensile strength of from 500-2500 psi and an elongation percentage of from 450-900%. Silicone is ozone resistant and can withstand low temperatures (e.g., down to −75° F.) and high temperatures (e.g., up to 500° F.). In some examples, the silicone rubber is a room-temperature vulcanizing silicone rubber.

The liner (104) further comprises a layer comprising a thermoplastic polymer. Thermoplastic polymers, like all polymers, are made up of small molecules, called monomers, which form long chains via the process of polymerization. For example, one thermoplastic polymer chain can comprise thousands of monomers. Thermoplastic polymers include, but are not limited to, polyethylene (PE), polypropylene (PP), polyvinyl chloride (PVC), polystyrene (PS), polyethylene terephthalate (PET), polybutylene terephthalate (PBT), and polyamide (PA).

In further examples, a liquid disposed on the thermoplastic polymer has a contact angle of from 0° to 90° with the thermoplastic polymer. Contact angle is a measure of the ability of a liquid to wet the surface of a solid. The contact angle is an angle formed by a liquid at the three-phase boundary where a liquid, gas, and solid intersect. As contact angle decreases, surface energy increases, surface tension decreases, and wettability increases. In some examples, when a contact angle of a liquid with a surface is less than 90°, the wetting of the surface by the liquid is very favorable and the liquid can spread over a large area of the surface. As described herein, a liquid having a contact angle less than 90° with the thermoplastic polymer can be favorable for bonding the thermoplastic polymer to the elastomer (e.g., for bonding polypropylene to silicone).

In certain examples, the thermoplastic polymer comprises polypropylene. Polypropylene is a thermoplastic polymer derived from propylene monomers and can have a formula as shown below. Polypropylene can be produced via chain-growth polymerization. Polypropylene can have a melting point of 320° F.

Formula II

In the liner (104), the layer of thermoplastic polymer (108) is coupled to the septum (110) comprising an elastomer. The thermoplastic polymer can be coupled to the elastomer using methods known in the art. For example, the thermoplastic polymer can be coupled to the elastomer via the application of coupling compositions such as primers, prime coats, adhesion promoters, or any combination thereof; these coupling compositions can be dilute solutions comprising silane coupling agents, along with other active ingredients. The coupling compositions are generally liquids and enhance the adhesion and bonding of silicones to a variety of substances. In some examples, these substances can include, but are not limited to, Dow Corning® 3-6060, 92-023, S-2260, or any combination thereof.

In further examples, the liner (104) comprises a septum (11) having a top surface and a bottom surface, the bottom surface being opposite and spaced apart from the top surface. The liner can further comprise a first layer comprising a first thermoplastic polymer (108), the first layer having, for example, a first surface and a second surface, the second surface being opposite and spaced apart from the first surface. In some examples of the liner (104), the septum (110) is disposed on the first layer comprising the first thermoplastic polymer (108) such that the bottom surface of the septum (110) is disposed on and in physical contact with the first surface of the first layer comprising the first thermoplastic polymer (108). In some examples, the top surface of the septum (110) is coupled to the first surface of the first layer comprising the first thermoplastic polymer (108). In further examples, the septum (110) can be disposed on a second layer comprising a second thermoplastic polymer (108), having, for example, a third surface and a fourth surface, the third surface being opposite and spaced apart from the fourth surface. In certain examples, the septum (110) is disposed on the second layer such that the top surface of the septum (110) is disposed on and in physical contact with the third surface of the second layer comprising the second thermoplastic polymer (108),), thus resulting in the septum (110) being sandwiched between the first layer of the first thermoplastic polymer (108) and the second layer of the second thermoplastic polymer (108). In some examples, the septum (110) is disposed on the second layer such that the bottom surface of the septum (110) is disposed on and in physical contact with the third surface of the second layer comprising the second thermoplastic polymer (108), thus resulting in the septum (110) being sandwiched between the first layer of the first thermoplastic polymer (108) and the second layer of the second thermoplastic polymer (108).

Figures 8A, 8B:
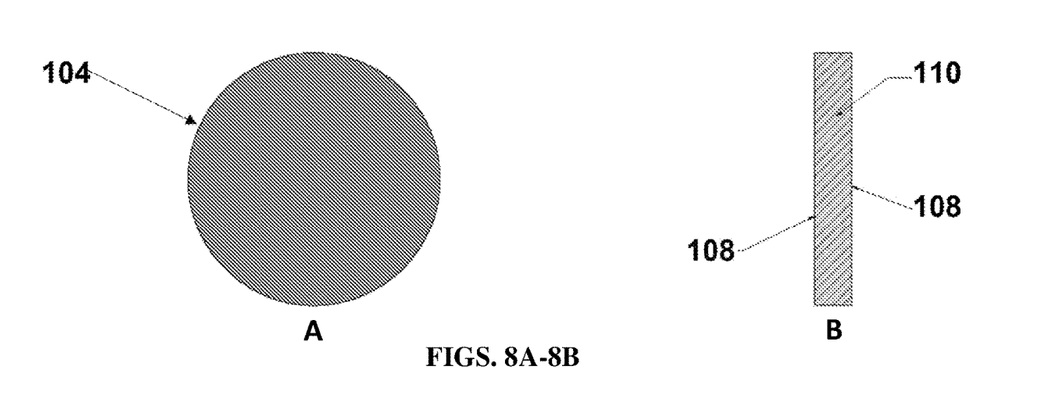
FIGS. 8A-8B show perspective view of an example liner having two layers of thermoplastic polymer.

Referring now to FIGS. 8A-8B, FIG. 8A is a perspective view of an example liner (104) with a diameter of 24 mm. FIG. 8B is a perspective view of an example liner, wherein the liner (104) includes an example septum (110) comprising silicone rubber coupled to an example first layer of a first thermoplastic polymer (108) on its top surface and an example second layer of a second thermoplastic polymer (108) on its bottom surface, wherein the first and second thermoplastic polymers comprise polypropylene.

In specific examples, the liner (104) can have a thickness and a cross-sectional shape. The cross-sectional shape can, for example, be substantially circular.

In some examples, the liner (104) has an average characteristic dimension. The term "characteristic dimension," as used herein, refers to the largest straight-line distance between two points in the plane of the cross-sectional shape. "Average characteristic dimension" generally refers to the statistical mean characteristic dimension. For example, when the liner has a cross-sectional shape that is substantially circular, the average characteristic dimension can refer to the average diameter, which is used herein interchangeably with "diameter." For a cap (102) with no screw threads (106), average diameter can refer to the inner diameter of the cap (102). For a cap (102) with screw threads (106), average diameter can refer to the largest straight line distance between two points on the inside of the screw threads (106).

In some examples, the liner (104) can have an average characteristic dimension of 9 millimeters (mm) or more (e.g., 10 mm or more, 11 mm or more, 12 mm or more, 13 mm or more, 14 mm or more, 15 mm or more, 16 mm or more, 17 mm or more, 18 mm or more, 19 mm or more, 20 mm or more, 21 mm or more, 22 mm or more, 23 mm or more, 24 mm or more, 25 mm or more, 26 mm or more, 27 mm or more, 28 mm or more, or 29 mm or more). In some examples, the liner (104) can have an average characteristic dimension of 30 mm or less (e.g., 29 mm or less, 28 mm or less, 27 mm or less, 26 mm or less, 25 mm or less, 24 mm or less, 23 mm or less, 22 mm or less, 21 mm or less, 20 mm or less, 19 mm or less, 18 mm or less, 17 mm or less, 16 mm or less, 15 mm or less, 14 mm or less, 13 mm or less, 12 mm or less, 11 mm or less, or 10 mm or less). The average characteristic dimension of the liner (104) can range from any of the minimum values described above to any of the maximum values described above. For example, the liner 9104) can have an average characteristic dimension of from 9 millimeters (mm) to 30 mm (e.g., from 9 to 12 mm, from 12 to 15 mm, from 15 to 18 mm, from 18 to 21 mm, from 21 to 24 mm, from 24 to 27 mm, from 27 to 30 mm, from 9 to 15 mm, from 9 to 18 mm, from 9 to 21 mm, from 9 to 24 mm, from 9 to 27 mm, from 9 to 30 mm, from 20 to 22 mm, from 20 to 24 mm, from 20 to 26 mm, from 20 to 28 mm, from 20 to 30 mm, from 22 to 23 mm, from 23 to 24 mm, from 24 to 25 mm, from 25 to 26 mm, from 16 to 18 mm, from 16 to 20 mm, from 16 to 22 mm, from 16 to 24 mm, from 18 to 19 mm, from 19 to 20 mm, from 20 to 21 mm, or from 21 to 22 mm). In further examples, the liner (104) has a diameter of 24 mm. In certain examples, the liner (104) has a diameter of 20 mm.

In some examples, the liner (104) has a thickness of 0.5 inches (in.) or less (e.g., 0.4 in. or less, 0.3 in. or less, 0.2 in. or less, or 0.1 in. or less). In certain examples, the liner (104) has a thickness of from 0 to 0.1 in., 0.1 to 0.2 in., 0.2 to 0.3 in., 0.3 to 0.4 in., or 0.4 to 0.5 inches. In specific examples, the liner (104) has a thickness of from 0 to 0.05 in., 0.05 to 0.1 in., 0.1 to 0.15 in., 0.15 to 0.2 in., 0.2 to 0.25 in., 0.25 to 0.3 in., 0.3 to 0.35 in., 0.35 to 0.4 in., 0.4 to 0.45 in., or 0.45 to 0.5 inches. In some examples, the liner (104) has a thickness of from 0 to 0.1 in., 0 to 0.2 in., 0 to 0.3 in., 0 to 0.4 in., or 0 to 0.5 inches.

In specific examples, the liner (104) is substantially free of perfluoroalkyl and polyfluoroalkyl substances (PFAS). In some examples, the liner (104) is free of PFAS. In some examples, the liner (104) comprises from 0 parts per trillion to 140,000 parts per trillion of PFAS (e.g., 0 to 20,000 parts per trillion, 20,000 to 40,000 parts per trillion, 40,000 to 60,000 parts per trillion, 60,000 to 80,000 parts per trillion, 80,0000 to 100,000 parts per trillion, 100,0000 to 120,000 parts per trillion, or 120,000 to 140,000 parts per trillion). In further examples, the liner (104) comprises 140,000 parts per trillion or less (e.g., up to 140,000 parts per trillion, up to 130,000 parts per trillion, up to 120,000 parts per trillion, up to 110,000 parts per trillion, up to 100,000 parts per trillion, up to 90,000 parts per trillion, up to 80,000 parts per trillion, up to 70,000 parts per trillion, up to 60,000 parts per trillion, up to 50,000 parts per trillion, up to 40,000 parts per trillion, up to 30,000 parts per trillion, up to 20,000 parts per trillion, or up to 10,000 parts per trillion). In certain examples, the liner (104) comprises from 0 parts per trillion to 1,000 parts per trillion (e.g., 0 to 100 parts per trillion, 100 to 200 parts per trillion, 200 to 300 parts per trillion, 300 to 400 parts per trillion, 400 to 500 parts per trillion, 500 to 600 parts per trillion, 600 to 700 parts per trillion, 700 to 800 parts per trillion, 800 to 900 parts per trillion, or 900 to 1,000 parts per trillion). In specific examples, the liner 9104) comprises form 0 parts per trillion to 100 parts per trillion (e.g., 0 to 10 parts per trillion, 10 to 20 parts per trillion, 20 to 30 parts per trillion, 30 to 40 parts per trillion, 40 to 50 parts per trillion, 50 to 60 parts per trillion, 60 to 70 parts per trillion, 70 to 80 parts per trillion, 80 to 90 parts per trillion, or 90 to 100 parts per trillion).

PFAS comprise molecules that are made up of a chain of linked carbon and fluorine atoms. Because of the strength of a carbon-fluorine bond, PFAS can degrade very slowly, or not at all, in the environment. PFAS can be used in nonstick coatings on cookware, stain-resistant clothes and carpets, or firefighting foam, in order to make it more effective. Further, PFAS can be used in industries such as aerospace, automotive, construction, electronics, and military equipment.

Currently, more than 9,000 PFAS have been identified. Due to the fact that PFAS can persist in the environment for an unknown amount of time and gradually accumulate and remain in the human body, there has been an increase in the concerns regarding the public health impact of PFAS.

PFAS include, but are not limited to, perfluorooctanoic acid (PFOA), perfluorooctyl sulfonate (PFOS), hexofluoropropylene oxide (HFPO) dimer acid, and their ammonium, sodium, and potassium salts, or any combination thereof. Further examples of PFAS include N-ethyl perfluorooctanesulfonamidoacetic acid, N-methyl perfluorooctanesulfonamidoacetic acid, perfluorobutanesulfonic acid, perfluorodecanoic acid, perfluorododecanoic acid, perfluoroheptanoic acid, perfluorohexanesulfonic acid, perfluorohexanoic acid, and perfluorononanoic acid. In certain examples, PFAS comprise perfluorooctanoic acid (PFOA), perfluorooctane sulfonate (PFOS), or any combination thereof.

Cap Assembly

Also provided herein is a cap assembly (100) comprising the liner (104) as disclosed herein and a cap (102), wherein the cap (102) is coupled to the liner (104). For example, the liner (104) can be coupled to the inside of the cap (102). The liner (104) may be coupled to the cap (102) using methods known in the art, for example as disclosed in U.S. Pat. Nos. 5,647,939 and/or 6,234,335.

As used herein, a cap (102) is a lid for an object such as a vial (112). Herein, the cap (102) can seal to a vial (112), for example to prevent evaporation and/or contamination of a sample contained within the vial. A cap (102) as disclosed herein can, for example, be a screw-on cap, a crimp-on cap, or a snap-on cap, meaning that the cap (102) can screw onto the vial (112), crimp onto the vial (112), or snap onto the vial (112), respectively. In some examples, the cap (102) is comprised of plastic, wherein the plastic can be a thermosetting plastic, a thermoplastic, or any combination thereof. Examples of plastics include, but are not limited to, phenolics, polyolefins, or any combination thereof. Examples of polyolefins include, but are not limited to, polyethylene, polypropylene, polybutylene, or any combination thereof.

In some examples, the cap (102) comprises a thermoplastic polymer. In further examples, the cap (102) comprises polypropylene.

In certain examples, the cap (102) comprises screw threads (106).

Figures 6A, 6B, 6C:
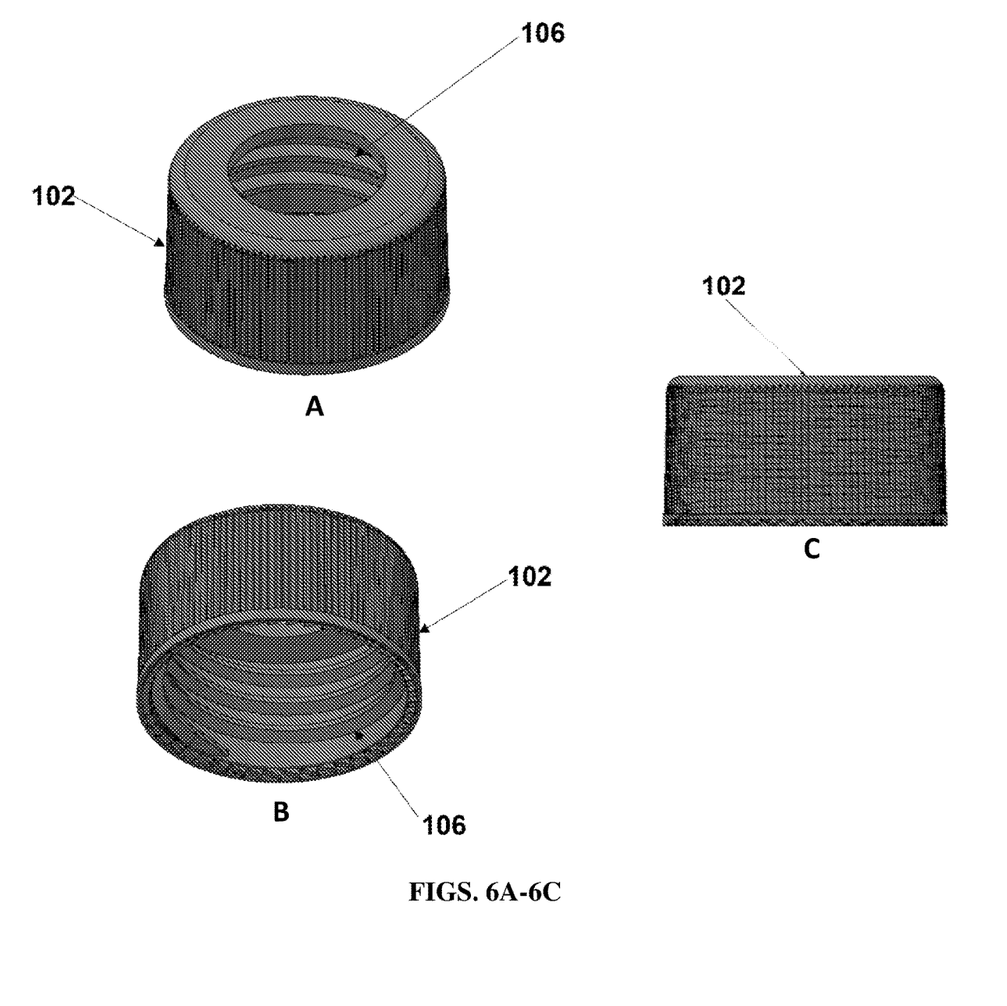
FIGS. 6A-6C show perspective views of an example cap.

Referring now to FIGS. 6A-6C, FIG. 6A is a perspective view of an example cap (102) made of plastic and including screw threads (106) for coupling to a vial via a screw mechanism. FIG. 6B is a perspective view of an example cap (102) made of plastic and including screw threads (106). FIG. 6C is a perspective view of the side of an example cap (12) made of plastic and having a 24 mm diameter.

In specific examples, the cap (102) comprises a metal. A metal is any of a class of substances characterized by high electrical and thermal conductivity, and in some aspects, malleability, ductility, and high reflectivity of light. Metals include, but are not limited to, aluminum, copper, brass, magnesium, tin, lead, bronze, zinc, or any combination thereof.

In some examples, the metal is malleable. Malleability describes the ability of a metal to be distorted below compression. Malleable metals therefore allow the cap (102) to be distorted, such as via a crimping technique.

In further examples, the metal comprises aluminum. Aluminum is silvery white in color, lightweight, highly resistant to corrosion, malleable and ductile, and has a low density. A cap (102) described herein can be made of aluminum, as in some examples, the cap (102) is sealed to a vial (112) via a crimping mechanism, which utilizes the malleability and ductility of aluminum.

In certain examples, the cap (102) has a cross-sectional shape. In some examples, the cross-sectional shape of the cap (102) is substantially circular.

In specific examples, the cap (102) can have an average characteristic dimension of 9 millimeters (mm) or more (e.g., 10 mm or more, 11 mm or more, 12 mm or more, 13 mm or more, 14 mm or more, 15 mm or more, 16 mm or more, 17 mm or more, 18 mm or more, 19 mm or more, 20 mm or more, 21 mm or more, 22 mm or more, 23 mm or more, 24 mm or more, 25 mm or more, 26 mm or more, 27 mm or more, 28 mm or more, or 29 mm or more). In some examples, the cap (102) can have an average characteristic dimension of 30 mm or less (e.g., 29 mm or less, 28 mm or less, 27 mm or less, 26 mm or less, 25 mm or less, 24 mm or less, 23 mm or less, 22 mm or less, 21 mm or less, 20 mm or less, 19 mm or less, 18 mm or less, 17 mm or less, 16 mm or less, 15 mm or less, 14 mm or less, 13 mm or less, 12 mm or less, 11 mm or less, or 10 mm or less). The average characteristic dimension of the cap (102) can range from any of the minimum values described above to any of the maximum values described above. For example, the cap (102) can have an average characteristic dimension of from 9 millimeters (mm) to 30 mm (e.g., from 9 to 12 mm, from 12 to 15 mm, from 15 to 18 mm, from 18 to 21 mm, from 21 to 24 mm, from 24 to 27 mm, from 27 to 30 mm, from 9 to 15 mm, from 9 to 18 mm, from 9 to 21 mm, from 9 to 24 mm, from 9 to 27 mm, from 9 to 30 mm, from 20 to 22 mm, from 20 to 24 mm, from 20 to 26 mm, from 20 to 28 mm, from 20 to 30 mm, from 22 to 23 mm, from 23 to 24 mm, from 24 to 25 mm, from 25 to 26 mm, from 16 to 18 mm, from 16 to 20 mm, from 16 to 22 mm, from 16 to 24 mm, from 18 to 19 mm, from 19 to 20 mm, from 20 to 21 mm, or from 21 to 22 mm). In some examples, the cap (102) has an average characteristic dimension of 24 mm. In further examples, the cap (102) has an average characteristic dimension of 20 mm.

Figures 1A, 1B:
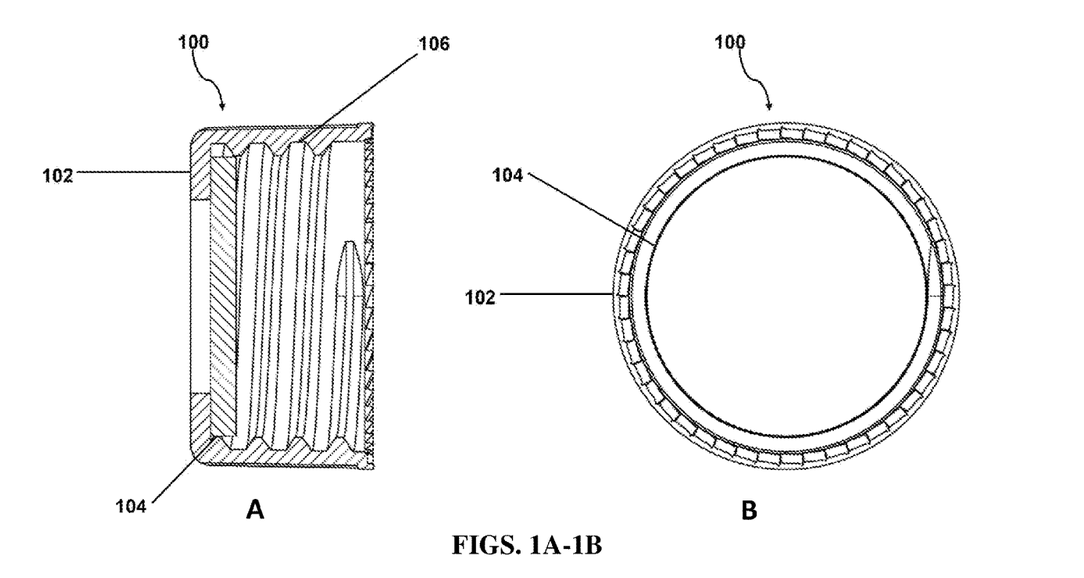
FIGS. 1A-1B are perspective views of an example cap assembly.

Referring now to FIGS. 1A-1B, FIG. 1A is a perspective view of an example cap assembly (100) comprising a liner (104) coupled to the inside of a cap (102), such that the liner (104) obscures a hole in the cap (102). Further, the cap (102) comprises screw threads (106) on the inside of the cap (102), such that it can be coupled to a vial (112) via a screw mechanism.

Figure 3:
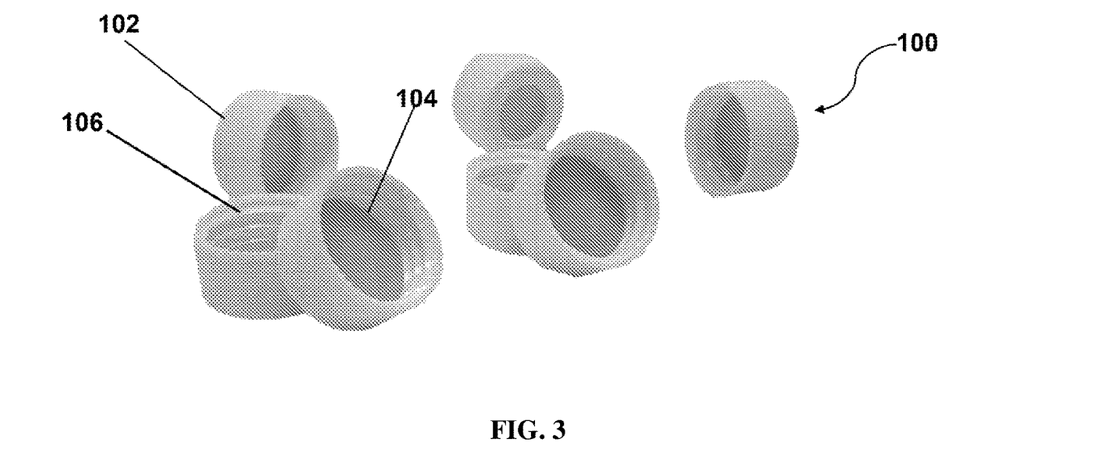
FIG. 3 shows multiple example cap assemblies with 24 mm screw-caps.

Referring now to FIG. 3, an example cap assembly (100) comprising an example cap (102) with a 24 mm diameter and made of polypropylene with screw threads (106) and a liner (104) coupled therein is shown.

Cap and Vial Assembly

Also provided herein is a cap and vial assembly (114) comprising the cap assembly (100) as disclosed herein and a vial (112), wherein the cap assembly (100) is coupled to the vial (112).

As used herein, a vial (112) is a closable vessel that can hold a solid, liquid, gas, or any combination thereof. A vial (112) can be made of any suitable material. For example, the vial (112) can be made of materials that include, but are not limited to, plastic, glass, or any combination thereof. A vial (112) can include, but is not limited to, a container, a well plate of any capacity, an ampoule, or a bottle. Examples of plastics that can be used to make a vial (112) include, but are not limited to, acrylics, high-density polyethylene, or any combination thereof. In some examples, the vial (112) can be made of a pharmaceutical-grade plastic. In further examples, the vial (112) can be made from glass and the glass used to make the vial (112) can include, but is not limited to, soda-lime glass, borosilicate glass, or any combination thereof. In further examples, the vial (112) comprises glass. In certain examples, the glass comprises borosilicate glass. In specific examples, the vial (112) comprises a plastic.

Figures 7A, 7B, 7C:
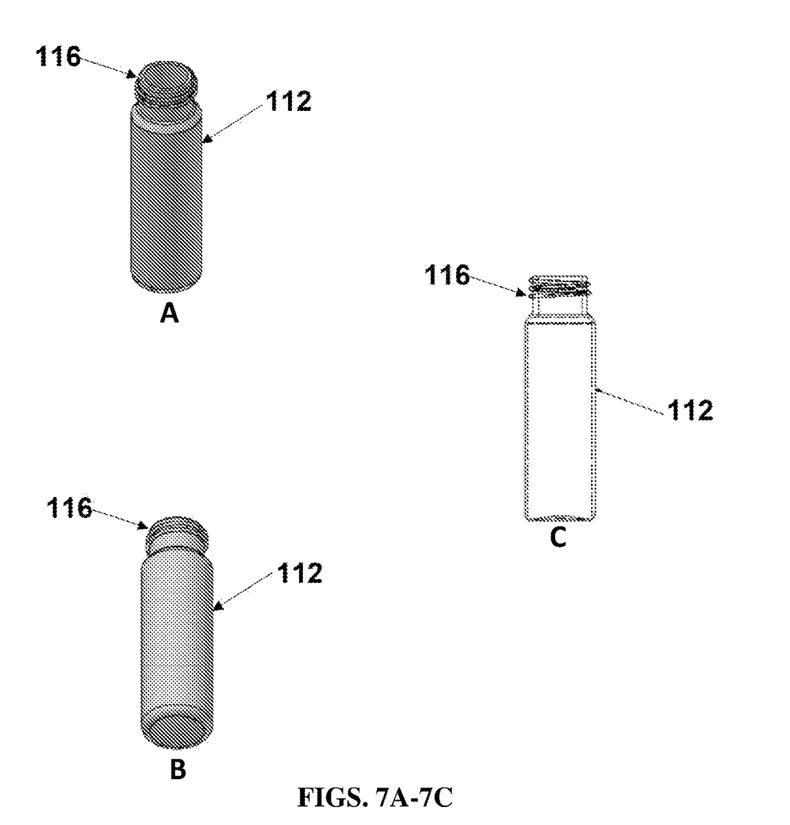
FIGS. 7A-7C show perspective views of an example vial.

Referring now to FIGS. 7A-7C, the figures are perspective views of an example vial (112) made of glass and including screw threads (116), wherein the screw threads allow for the vial (112) to be coupled to a cap or cap assembly via a screw mechanism.

In some examples, the vial (112) can have a volume of from 1 mL to 500 mL (e.g., 1 to 50 mL, 50 to 100 mL, 100 to 150 mL, 150 to 200 mL, 200 to 250 mL, 250 to 300 mL, 300 to 350 mL, 350 to 400 mL, 400 to 450 mL, or 450 to 500 mL).

In some examples, the cap (102) and the vial (112) each independently comprise screw threads (106, 116), such that the cap assembly (100) is configured to be coupled to the vial (112) with a screw mechanism. As used herein, a "screw mechanism" refers to a mechanism wherein a cylindrical shaft with helical grooves around at least a portion of the outside of the shaft, known as threads, passes through a hole in another object or medium with threads on the inside of the hole, wherein the threads on the inside of the hole mesh with threads on the outside of the shaft. Herein, the threads on a cylindrical shaft are the threads (116) on the vial (112) and the threads on the inside of the hole are the threads (106) on the inside of the cap (102). In screwing the cap assembly (100) to the vial (112), the cap assembly (100) is sealed to the vial (112) and the contents of the vial (112) are thus sealed within the vial (112), for example to minimize or prevent evaporation and/or contamination.

In further examples, the cap assembly (100) is configured to be coupled to the vial (112) with a crimping mechanism. As used herein, a "crimping mechanism" refers to a mechanism wherein an object made with malleable metal is attached to a container, such as a vial (112), by bending the metal over the outer edge of the vial (112). This can be done with a device such as a vial crimper. Herein, the crimping mechanism is utilized as a means of sealing a metal cap assembly (100) to a vial (112) such that the contents of the vial (112) are sealed within the vial (112), for example to minimize or prevent evaporation and/or contamination, and entails placing a metal cap assembly (100) on a vial (112) and crimping the cap assembly (100) to the vial (112) using a crimping tool.

In certain examples, the cap assembly (100) is configured to be coupled to the vial (112) with a snap mechanism. As used herein, a "snap mechanism" refers to a mechanism wherein a cap (102) is clamped to a container via the application of force to the cap (102). Herein, the snap mechanism is utilized as a means of sealing a plastic cap assembly (100) to a vial (112) such that the contents of the vial (112) are sealed within the vial (112), for example to minimize or prevent evaporation and/or contamination, and entails placing a cap assembly (100) on a vial (112) and applying force to the cap assembly (100) such that it clamps onto the top of the vial (112).

Figures 4A, 4B, 4C:
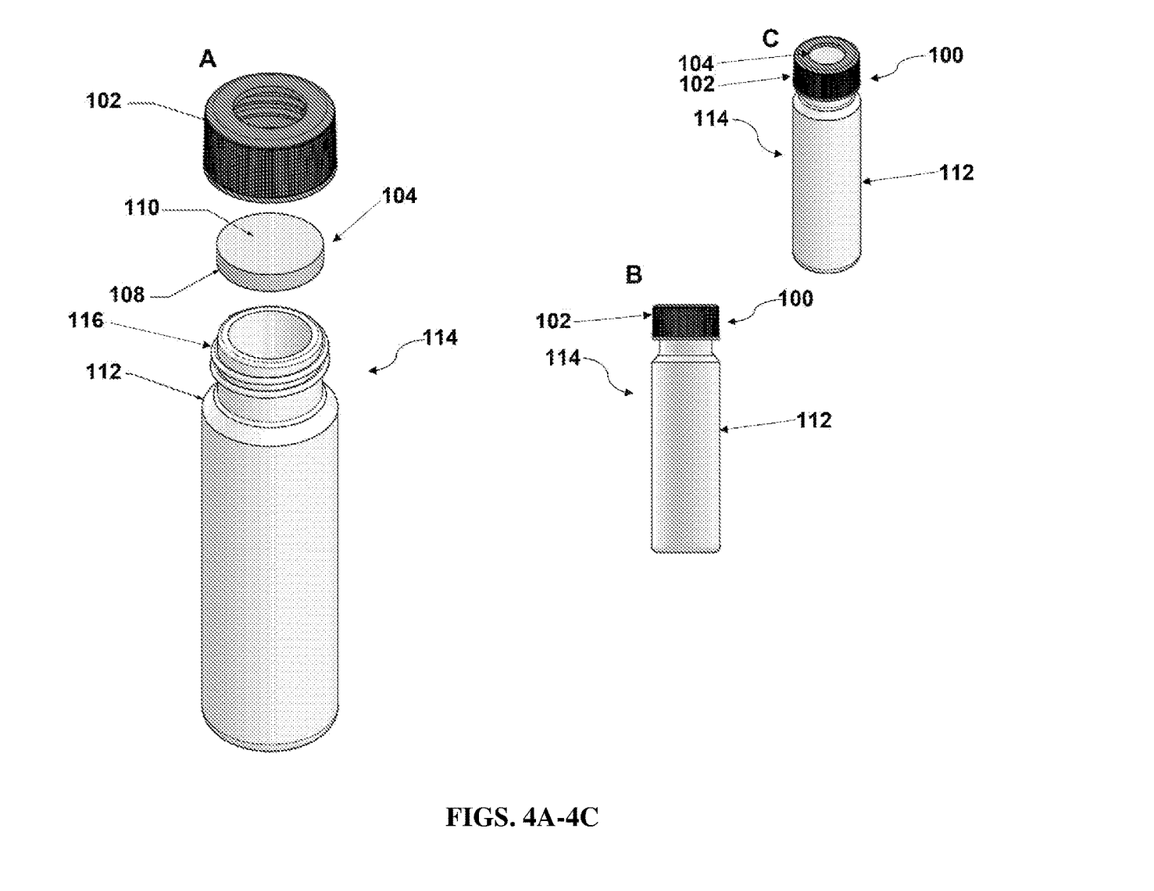
FIGS. 4A-4C show an exploded perspective view and perspective view of an example cap and vial assembly.

Referring now to FIGS. 4A-4C, FIG. 4A is an exploded perspective view of an example cap and vial assembly (114). An example cap (102) made of plastic and having a 24 mm diameter is coupled to an example liner (104) with a diameter of 24 mm, wherein the liner (104) includes an example septum (110) comprising silicone rubber coupled to an example layer of thermoplastic polymer (108) comprising polypropylene. The cap (102) and liner (104) can be coupled to an example vial (112) via a screw mechanism that uses the screw threads (116) on the vial (112). FIG. 4B is a perspective view of an example cap and vial assembly (114). An example cap assembly (100) comprising an example cap (102) made of plastic and having a 24 mm diameter is coupled to an example vial (112) comprising glass. FIG. 4C is a perspective view of an example cap and vial assembly (114), comprising an example cap assembly (100) which includes an example cap (102) made of plastic and having a 24 mm diameter and an example liner (104) having a 24 mm diameter and comprising silicone rubber and polypropylene, coupled to an example vial (112) comprising glass.

Methods

Method of Testing Water Quality

The present disclosure, in one aspect, provides for a method of testing water quality in a sample.

Water quality testing can follow various regulations and methods, which can depend on factors such as the designated use of a body of water, the criteria for protecting the designated uses, and the antidegradation requirements for protect existing uses and high quality/high value water. Designated uses of water can include (1) protection and propagation of fish, shellfish, and wildlife, (2) recreation, (3) public drinking water supply, or (4) agricultural, industrial, navigation, and other purposes. Water quality testing can include testing water for pollutants, such as PFAS, as well as other pollutants. In some examples, the criteria for methods of water quality testing can be prescribed by the U.S. Environmental Protection Agent (EPA), European Chemicals Agency (ECHA), Canada's Department of the Environment, state, territory, authorized tribe organization, or any combination thereof. Further, the water quality criteria, such as a maximum concentration level for a pollutant or a description of desired water conditions, can also be prescribed by the above organizations. Example methods of water quality testing of PFAS in drinking water are included in Shoemaker, J. A. and Tettenhorst, D. R., *Method 537.1: Determination of Selected Per- and Polyfluorinated Alkyl Substances in Drinking Water by Solid Phase Extraction and Liquid Chromatography/Tandem Mass Spectrometry (LC/MS/MS)*, EPA Document #: EPA/600/R-18/352, Version 1.0. November 2018.

For example, the present disclosure, in one aspect, provides for a method of testing water quality in a sample using an analytical instrument, wherein the sample is contained within a container comprising the liner (104) as disclosed herein, the cap assembly (100) as disclosed herein, the cap and vial assembly (114) as disclosed herein, the method comprising penetrating the liner (104) with a syringe (118) to remove a portion of the sample and testing the portion of the sample using the analytical instrument.

As used herein, a syringe (118) is a reciprocating pump comprising a plunger that fits tightly within a cylindrical tube having a longitudinal axis. The plunger can be linearly translocated (e.g., pulled and/or pushed) axially along the inside of the tube, allowing the syringe (118) to take in and expel liquid or gas through a discharge orifice at an open end of the tube. The open end of the tube can be fitted with, for example, a hypodermic needle, a nozzle, and/or tubing to direct flow into and out of the syringe (118). As used herein, "syringe" and "needle" are used interchangeably. Further, the syringe (118) can include a syringe or needle as connected to an auto-sampler device, wherein an auto-sampler is a device that automatically loads collected samples into a laboratory instrument (e.g., an analytical instrument), such as a gas chromatograph, liquid chromatograph, mass spectrometer, or any combination thereof. The syringe (118) can be single-use or multi-use.

Further, the syringe (118) can have any suitable size and/or volume. In some examples, the syringe (118) can have a volume of from 1 mL to 50 mL (e.g., 1 mL to 10 mL, 10 mL to 20 mL, 20 mL to 30 mL, 30 mL to 40 mL, or 40 mL to 50 mL). In further examples, the syringe (118) can have a volume of from 1 mL to 25 mL or 25 mL to 50 mL (e.g., 1 mL to 5 mL, 1 mL to 10 mL, 1 mL to 15 mL, 1 mL to 20 mL, 1 mL to 25 mL, 1 mL to 30 mL, 1 mL to 35 mL, 1 mL to 40 mL, 1 mL to 45 mL, or 1 mL to 50 mL).

In some examples, the syringe (118) can have a volume of from 5 to 1000 μL. In further examples, the syringe (118) can have a volume of from 5 to 100, 100 to 200, 200 to 300, 300 to 400, 400 to 500, 500 to 600, 600 to 700, 700 to 800, 800 to 900, or 900 to 1000 μL. In certain examples, the syringe (118) can have a volume of 5 μL or more, 10 μL or more, 25 μL or more, 50 μL or more, 100 μL or more, 250 μL or more, 500 μL or more, or 1000 μL or more. A syringe (118) having a volume of from 5 to 1000 μL can also be referred to as a "micro syringe."

In some examples, the analytical instrument is a gas chromatograph, liquid chromatograph, mass spectrometer, or any combination thereof.

Gas chromatography is an analytical technique used to separate chemical components in a mixture and detect them to determine their presence, absence, and/or concentration. The chemical components subject to detection can include organic molecules or gases. Gas chromatography can be used for quality control in the manufacture of products ranging from cars to chemicals, such as petrochemicals or pharmaceuticals, research, or safety and monitoring of environmental samples, microplastics, or food. Gas chromatography can be performed on a gas chromatograph (GC). A GC operates by transporting the sample molecules from a solid, liquid, and/or gas in a carrier gas through a heated analytical column and into a detector which responds to the chemical components eluting from the column to produce a signal, which is recorded by appropriate software to produce a chromatogram. The sample can be extracted via a syringe (118) and/or an autosampler. If a sample is not a gas, the chemical components of the sample are first vaporized.

Liquid chromatography is an analytical technique in which the sample ions or molecules are dissolved in a liquid mobile phase. Liquid chromatography can be performed on a liquid chromatograph (LC) which operates by transporting the sample in the liquid mobile phase through a column or plane packed with a stationary phase. Different solutes interact with the stationary phase to different degrees due to differences in ion-exchange, adsorption, partitioning, and/or size, thus separating the compounds. The transit time of the solute through the column is determined based on these differences. The sample can be extracted into the liquid chromatograph via a syringe (118) and/or an autosampler.

Gas chromatographs and/or liquid chromatographs can further be equipped with a mass spectrometer.

Mass spectrometry is an analytical tool useful for measuring the mass-to-charge ratio (m/z) of one or more molecules present in a sample. A mass spectrometer (MS) converts individual molecules from a sample into ions so that they can be moved and manipulated by internal electric and magnetic fields. The mass spectrometer comprises three components: the ion source, mass analyzer, and detector. The ion source ionizes the sample. In some examples, the ion source ionizes the sample to cations by loss of an electron. In further examples, the ion source ionized the sample to anions. The mass analyzer sorts and separates the ions according to their mass and charge. The detector measures the separated ions and displays the results on a chart. In some examples, a mass spectrometer may be utilized in tandem with a gas chromatograph and/or liquid chromatograph.

In further examples, the method comprises removing one or more portions of the sample by penetrating the liner (104) with the syringe (118) one or more times (e.g., 2 or more, 3 or more, 4 or more, 5 or more, 6 or more, 7 or more, 8 or more, 9 or more, 10 or more, 11 or more, 12 or more, 13 or more, 14 or more, 15 or more, 16 or more, 17 or more, 18 or more, or 19 or more). In some examples, the method comprises removing one or more portions of the sample by penetrating the liner (104) with the syringe (118) 20 times or less (e.g., 19 or less, 18 or less, 17 or less, 16 or less, 15 or less, 14 or less, 13 or less, 12 or less, 11 or less, 10 or less, 9 or less, 8 or less, 7 or less, 6 or less, 5 or less, 4 or less, 3 or less, or 2 or less). The number of times the liner is penetrated (and accordingly the number of portions of sample removed) can range from any of the minimum values described above to any of the maximum values described above. For example, the methods can comprise removing one or more portions of the sample by penetrating the liner (104) with the syringe (118) from 1 to 20 times.

Figures 2A, 2B:
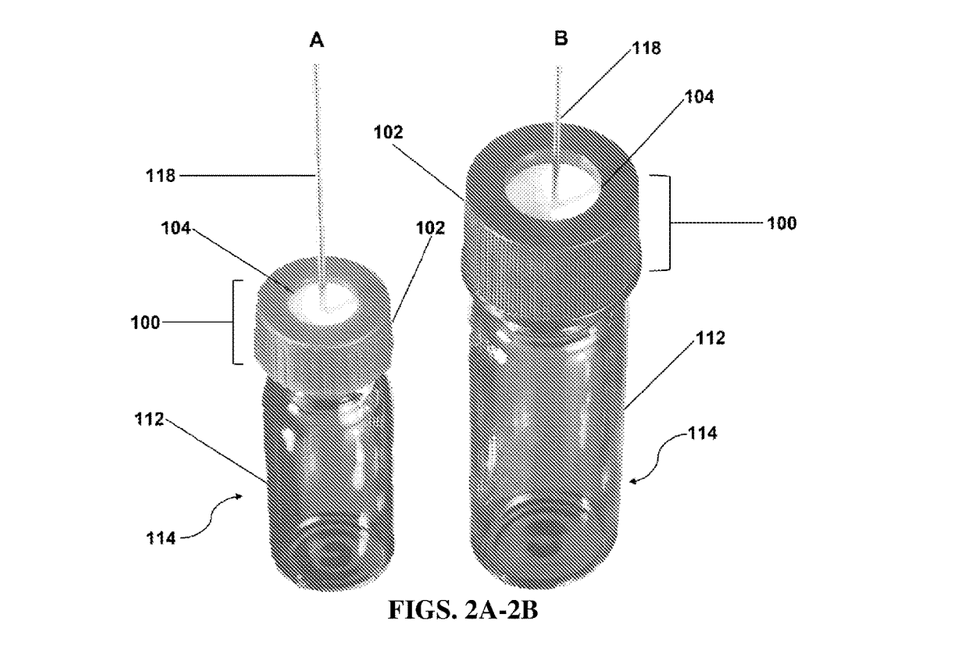
FIG. 2A shows an example cap having a 9 mm diameter and screw threads.
FIG. 2B shows an example cap having a 24 mm diameter and screw threads.

Referring now to FIGS. 2A-2B, FIG. 2A shows an example cap and vial assembly (114) with a syringe (118) actively penetrating the liner (104). The example liner (104) is 9 mm in diameter and is correspondingly coupled to an example cap (102) that is 9 mm in diameter, thus resulting in an example cap assembly (100). The example vial (112) is 1.5 mL and comprises glass. FIG. 2B similarly shows an example cap and vial assembly (114) with a syringe (118) actively penetrating the liner (104). The example liner (104) in FIG. 2B is 24 mm in diameter and is correspondingly coupled to an example cap (102) that is 24 mm in diameter, thus resulting in an example cap assembly (100). The example vial (112) is 20 mL and comprises glass.

Figure 9A:
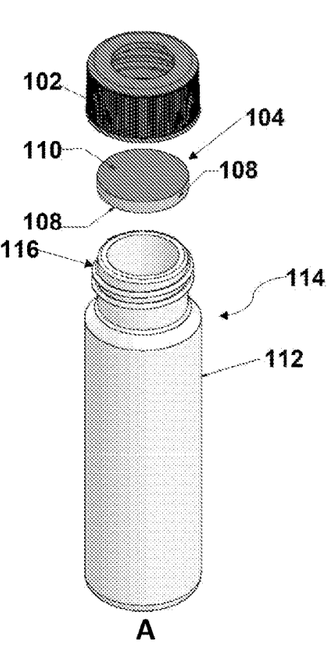
FIGS. 9A-9C show exploded perspective views and perspective views of an example cap and vial assembly, wherein the example liner has two layers of thermoplastic polymer.
Figure 9B:
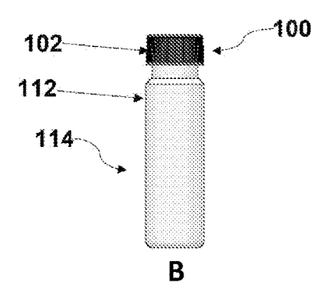
Figure 9C:
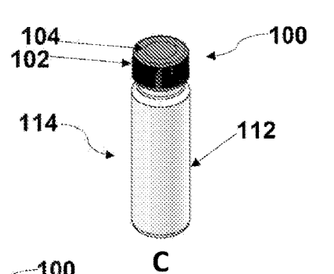

Referring now also to FIGS. 9A-9C, FIG. 9A is an exploded perspective view of an example cap and vial assembly (114). An example cap (102) made of plastic and having a 24 mm diameter is coupled to an example liner (104) with a diameter of 24 mm, wherein the liner (104) includes an example septum (110) comprising silicone rubber coupled to a first example layer of thermoplastic polymer (108) on its top surface and a second example layer of thermoplastic polymer (108) on its bottom surface, wherein the polymer comprises polypropylene. The cap (102) and liner (10) are then coupled to an example vial (112) via a screw mechanism that uses the screw threads (116) on the vial (112). FIG. 9B is a perspective view of an example cap and vial assembly (114). An example cap assembly (100) comprising an example cap (102) made of plastic and having a 24 mm diameter is coupled to an example vial (112) that comprises glass. FIG. 9C is a perspective view of an example cap and vial assembly (114), comprising an example cap assembly (100) which includes an example cap (102) made of plastic and having a 24 mm diameter and an example liner (104) having a 24 mm diameter and comprising silicone rubber and polypropylene, coupled to an example vial (112) that comprises glass.

A number of embodiments of the disclosure have been described. Nevertheless, it will be understood that various modifications may be made without departing from the spirit and scope of the invention. Accordingly, other embodiments are within the scope of the following claims.

Other advantages which are obvious, and which are inherent to the invention, will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods and products of the appended claims are not limited in scope by the specific methods and products described herein, which are intended as illustrations of a few aspects of the claims and any methods and products that are functionally equivalent are intended to fall within the scope of the claims. Various modifications of the methods and products in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A cap assembly free of polyfluoroalkyl substances (PFAS) comprising:
   a liner comprising a septum and a layer, wherein the layer comprises a first thermoplastic polymer, wherein the septum comprises a cured elastomer, and wherein the septum is coupled to the layer comprising the first thermoplastic polymer, wherein the liner is free of PFAS; and a cap, wherein the cap is coupled to the liner, further wherein the cap has an average characteristic dimension of from 9 millimeters (mm) to 30 mm, further wherein the liner has an average characteristic dimension of from 9 mm to 30 mm;

wherein the septum couples directly with the cap without an intervening thermoplastic layer or adhesive.

2. The cap assembly of claim 1, wherein the cap comprises polypropylene.

3. The cap assembly of claim 1, wherein the cap comprises screw threads.

4. The cap assembly of claim 1, wherein the cap comprises a metal.

5. The cap assembly of claim 4, wherein the metal comprises aluminum.

6. The cap assembly of claim 1, wherein the cap has a cross-sectional shape, wherein the cross-sectional shape is substantially circular.

7. The cap assembly of claim 1, wherein the cap has an average characteristic dimension of from 9 mm to 30 mm.

8. A cap and vial assembly comprising the cap assembly of claim 1, and a vial, wherein the cap assembly is coupled to the vial.

9. The cap and vial assembly of claim 8, wherein the vial comprises glass or a plastic.

10. The cap and vial assembly of claim 8, wherein both the cap and the vial comprise screw threads such that the cap assembly is configured to be coupled to the vial with a screw mechanism.

11. The cap and vial assembly of claim 8, wherein the cap assembly is configured to be coupled to the vial with a crimping mechanism or a snap mechanism.

12. The cap assembly free of polyfluoroalkyl substances (PFAS) of claim 1, wherein the elastomer comprises silicone rubber.

13. The cap assembly free of polyfluoroalkyl substances (PFAS) of claim 1, wherein a liquid disposed on the thermoplastic polymer has a contact angle of from 0° to 90° with the first thermoplastic polymer.

14. The cap assembly free of polyfluoroalkyl substances PFAS) of claim 1, wherein the first thermoplastic polymer comprises polypropylene.

15. The cap assembly free of polyfluoroalkyl substances (PFAS) of claim 1, wherein the liner has a thickness and a cross-sectional shape, wherein the cross-sectional shape is substantially circular.

16. The cap assembly free of polyfluoroalkyl substances (PFAS) of claim 1, wherein the liner has an average characteristic dimension of from 9 millimeters (mm) to 30 mm.

* * * * *